(12) United States Patent
Prevel et al.

(10) Patent No.: US 11,577,807 B2
(45) Date of Patent: Feb. 14, 2023

(54) DEPLOYABLE UNDERWATER DEVICE (71) Applicant: THALES, Courbevoie (FR)

(72) Inventors: Florian Prevel, Brest (FR); Philippe Kerdraon, Brest (FR)

(73) Assignee: THALES, Courbevoie (FR)

( * ) Notice: Subject to any disclaimer, the term of this patent is extended or adjusted under 35 U.S.C. 154(b) by 276 days.

(21) Appl. No.: 16/762,129

(22) PCT Filed: Dec. 27, 2018

(86) PCT No.: PCT/EP2018/097049
§ 371 (c)(1),
(2) Date: May 6, 2020

(87) PCT Pub. No.: WO2019/129826
PCT Pub. Date: Jul. 4, 2019

(65) Prior Publication Data
US 2020/0361571 A1 Nov. 19, 2020

(30) Foreign Application Priority Data
Dec. 28, 2017 (FR) ...................................... 1701400

(51) Int. Cl.
*B63B 22/00* (2006.01)
*B63G 9/00* (2006.01)
*G01V 1/38* (2006.01)

(52) U.S. Cl.
CPC ...... *B63B 22/003* (2013.01); *B63B 2022/006* (2013.01); *B63G 2009/005* (2013.01); *G01V 1/3843* (2013.01)

(58) Field of Classification Search
CPC ............ B63B 22/003; B63B 2022/006; B63G 2009/005; G01V 1/3843; G10K 11/008
See application file for complete search history.

(56) References Cited

U.S. PATENT DOCUMENTS

| | | | |
|---|---|---|---|
| 3,047,259 A | 7/1962 | Tatnall et al. | |
| 3,212,110 A | 10/1965 | Lombardo | |
| 4,004,308 A * | 1/1977 | Gongwer | B63B 22/18 441/22 |
| 6,400,645 B1 * | 6/2002 | Travor | G10K 11/006 367/4 |
| 8,605,540 B2 * | 12/2013 | Baker | B63B 22/18 367/4 |
| 2016/0221655 A1 | 8/2016 | Austin et al. | |

FOREIGN PATENT DOCUMENTS

WO 2010/025494 A1 3/2010

* cited by examiner

*Primary Examiner* — Anthony D Wiest
(74) *Attorney, Agent, or Firm* — BakerHostetler

(57) ABSTRACT

An underwater device intended to be deployed in the water, the device includes a set of arms articulated to a support body having a reference axis r, the arms being able to be kept in a furled configuration and able to deploy into a deployed configuration wherein the arms extend about the reference axis r, the arms deploying by distal ends of the arms moving away from the axis r, a set of at least one bending spring stressed elastically in bending when the arms are kept in a furled configuration and able to relax when the arms are released from the furled configuration, the set of at least one bending spring being configured and arranged in such a way as to exert, on at least one of the arms, when the arms are released from the furled configuration, a thrust that instigates the deploying of the arms.

14 Claims, 9 Drawing Sheets

DEPLOYABLE UNDERWATER DEVICE

CROSS-REFERENCE TO RELATED APPLICATIONS

This application is a National Stage of International patent application PCT/EP2018/097049, filed on Dec. 27, 2018, which claims priority to foreign French patent application No. FR 1701400, filed on Dec. 28, 2017, the disclosures of which are incorporated by reference in their entirety.

FIELD OF THE INVENTION

The field of the invention is that of deployable underwater devices intended to be deployed under the water.

The invention relates in particular to the air-launchable acoustic buoys better known as "sonobuoys". Air-launchable sonobuoys comprise a sonar comprising an antenna for receiving acoustic waves comprising a support body, arms articulated to the body of the support, and hydrophones borne by the arms. The buoy conventionally comprises a cylindrical casing of standardized dimensions and internal elements initially housed inside the casing. The arms are then in a furled configuration in which they are distributed about a reference axis of the support body and extend longitudinally parallel to this reference axis. The internal elements of the buoy leave the casing when the buoy is immersed, this having the effect of releasing the arms from the furled configuration. The arms then deploy into a deployed configuration by one of their ends moving away from the reference axis which is substantially vertical once the buoy is immersed. The buoy comprises guy lines to ensure the deployment of the arms. Each guy line is connected on the one hand to an arm and on the other hand to a suspension line between the support body and a floating body. The suspension line is vertically taut along the reference axis under the effect of the immersion of the buoy and the separation of the floating body, which floats up to the surface, and of the support body which sinks, the effect of this being to tension the guy lines which then pull on the arms. This deployment solution may prove unable to generate a turning moment capable of instigating the deployment of the arms, particularly when the arms make, with the axis of the suspension line, an angle smaller than the angle made between the guy lines and this same suspension line. Means for instigating the deployment of the arms are then provided in the form of torsion springs. Each arm is associated with a torsion spring which will initiate the deployment thereof. A torsion spring conventionally comprises a central part formed of a plurality of turns wound around the one same axis of winding and two rigid levers connected to one another via the central part. The torsion springs are stressed locally in bending but overall in torsion when the arms are being kept in the furled configuration. In other words, each torsion spring is subjected overall, between its two levers, to a torque about the axis of winding. When the arms leave the casing, the arms are released from the furled configuration and the torsion springs restitute the torsion energy, instigating the deployment of the arms. One of the levers pivots with respect to the body about the axis of winding.

BACKGROUND

The springs are installed at the distal ends of the arms, namely at their opposite ends to the articulations of the arms to the support body. When the arms are in the furled configuration, the distal ends are angularly distributed about the reference axis. Each torsion spring is interposed between the reference axis and the arm with which it is associated and the axes of winding, which are parallel to the reference axis, are angularly distributed about the reference axis. Each torsion spring comprises a lever resting against the arm. When the arms are released, the lever pivots about the axis of winding of the torsion spring, and exerts a thrust that is radial with respect to the reference axis on the distal end of the arm so as to instigate the deployment thereof.

This solution presents problems with reliability. The arms do not always deploy or may deploy too slowly or insufficiently for the guy lines to be able to take over. The buoy may then become unserviceable or exhibit diminished performance.

SUMMARY OF THE INVENTION

It is an object of the invention to limit at least one of the aforementioned disadvantages.

To this end, the invention relates to an underwater device intended to be deployed in the water, the device comprising:
 a set of arms articulated to a support body having a reference axis r, the arms being able to be kept in a furled configuration and able to deploy into a deployed configuration in which the arms extend about the reference axis r, the arms deploying by distal ends of the arms moving away from the axis r,
 a set of at least one bending spring stressed elastically in bending when the arms are kept in a furled configuration and able to relax when the arms are released from the furled configuration, the set of at least one bending spring being configured and arranged in such a way as to exert, on at least one of the arms, when the arms are released from the furled configuration, a thrust that instigates the deploying of the arms.

Advantageously, the invention comprises at least one of the features hereinbelow considered alone or in combination:
 the bending spring is arranged in such a way as to deform essentially in a plane perpendicular to the reference axis as it relaxes,
 the arms are angularly distributed about the reference axis r of the support body,
 at least one bending spring comprises an anchoring part that is fixed with respect to the reference axis r and a deformable part that deforms when the bending spring relaxes, the deformable part being wound around the reference axis when the arms are being kept in the furled configuration, and unwinding as the spring relaxes under the effect of the releasing of the arms,
 the bending spring comprises an anchoring part that is fixed with respect to the axis r and a deformable part that deforms as the bending spring relaxes, the deformable part extending about the axis r, when the arms are being kept in the furled configuration, over an angular sector comprising a reference angular sector delimited by a first arm of the set of the arms on which the bending spring exerts a thrust so as to instigate its deployment as it relaxes and by a second arm of the set of arms, which arm is adjacent to the first arm,
 the deformable part extends beyond the reference angular sector, on the side of the second arm,
 the deformable part extends beyond the reference angular sector, on the side of the first arm, the deformable part comprises a free end lying beyond the sector S in the opposite direction to the second arm when starting from the first arm, the set of at least one bending spring comprises several bending springs, each bending spring being configured and arranged in such a way as to instigate the spring of a single arm, the bending springs are superposed when the arms are being kept in the furled configuration, the set of at least one bending spring is positioned close to the distal end of the arm, the device comprises retaining means able to keep the arms in the furled configuration and to release them, said retaining means comprise a flexible clamping band placed under elastic bending in order to surround the arms so as to keep them in the furled configuration, the flexible band being kept under bending by two pins, the flexible band being released by driving just one of the two pins in a translational movement with respect to the flexible band along the reference axis, the device is of the air-launchable sonobuoy type, the bending spring is stressed in bending overall, when the arms (10a, 10b, 10c, 10d, 10e) are being kept in the furled configuration, and works in bending overall when the arms are released, the thrust that instigates the deployment of the arm has a component that is radial with respect to the reference axis.

BRIEF DESCRIPTION OF THE DRAWINGS

The invention will be better understood from studying a number of embodiments described by way of nonlimiting examples and illustrated by attached drawings in which:

FIG. 1b depicts the immersion of the air-launchable buoy and FIG. 1c schematically depicts the start of deployment of the buoy after it has become immersed, FIG. 2 schematically depicts internal elements of a deployable buoy, FIG. 3 schematically depicts the buoy of FIG. 2 when the arms are elongated, FIG. 4 schematically depicts the buoy of FIG. 2 in a deployed configuration, FIG. 5 schematically depicts the buoy of FIG. 2 in a configuration that is intermediate between FIG. 4 and FIG. 3, FIG. 6 more specifically depicts one example of a deployed air-launchable buoy according to the invention, FIG. 7 schematically depicts a section through the buoy of FIG. 6 on the plane P of the body 8 when the arms are being kept in the furled configuration, FIG. 8 schematically depicts a section through the buoy of FIG. 6 on the plane P in the deployed configuration of FIG. 6, FIG. 9 schematically depicts a perspective view of the body 8 in the configuration of FIG. 6.

From one figure to another, the same elements are denoted by the same numerical references.

DETAILED DESCRIPTION

The description which follows relates to air-launchable sonobuoys. The invention also applies to any deployable underwater device comprising a plurality of arms distributed about a reference axis r of a support body and articulated, at their proximal end, to the support body so as to be able to be in a furled configuration and in a deployed configuration, each arm passing from the furled configuration to the deployed configuration by a distal end of the arm moving away from the reference axis. The invention also applies, for example, to floating anchors of the type comprising deployable arms between which a sail may be stretched or to anchors of the grapple type also comprising deployable arms of the anchor tine type.

The arms may extend radially about the reference axis r in the deployed configuration. To this end, each arm may be connected to the support body by a pivot connection of axis tangential to the reference axis r. In other words, the projections of the respective arms in a plane perpendicular to the axis r extend along respective radial axes which are defined with respect to this axis.

As an alternative, the arms do not extend radially with respect to the reference axis r of the support body in the deployed configuration. They may then, for example, be connected to the support body by a pivot connection of axis not tangential to the reference axis r. Advantageously, the arms are inclined with respect to the reference axis r in the deployed configuration.

Advantageously, the arms are uniformly distributed about the reference axis. In other words the angle of the angular sector made about the reference axis and delimited by two adjacent arms is the same for all of the pairs of adjacent arms. As an alternative, the angles of at least two sectors delimited by two adjacent arms are different.

The arms may have a fixed length or may be extendable, for example may be telescopic. The arms then have a stowed configuration in which they are in a furled configuration. They pass from the stowed configuration to the deployed configuration by the elongating of the arms and by passing from the furled configuration to the deployed configuration.

The underwater device may comprise a suspension line connected to the support body, the suspension line extending substantially along the reference axis r and being substantially vertical right from the start of deployment of the arms.

The device comprises deployment means allowing the arms to be moved toward their deployed configuration. These deployment means may comprise deployment lines of the guy line type. Each guy line is connected, on the one hand, to one of the arms and, on the other hand, to a suspension line connecting the support body to a float so that, under the effect of the immersion of the device, the float and the support body move away from one another causing the suspension line to deploy and become taut, extend vertically along the reference axis, and tension the guy lines which will then pull on the arms.

As an alternative, floats are for example fixed to the distal ends of the arms so that when the arms are released, the floats cause the arms to deploy. As an alternative, torsion springs may be installed at the articulations of the arms to the support body. The axis of winding of each torsion spring extends along the axis of the pivot connection connecting the arm to the support body.

The underwater device may be configured such that the arms pass automatically from the stowed configuration to the deployed configuration when the underwater device becomes immersed or may be configured to deploy the arms on command.

Figure 1A:
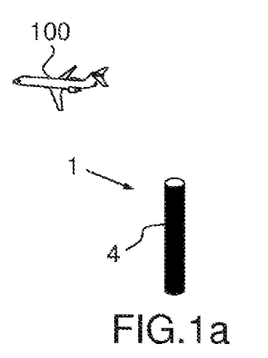
FIG. 1a schematically depicts the launching of an air-launchable buoy from an aircraft.
Figure 1B:
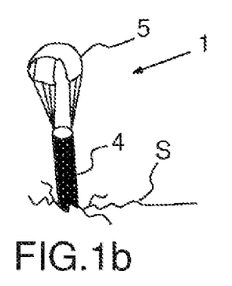

FIG. 1a depicts an aircraft A launching an air-launchable sonobuoy 1 according to the invention into a marine environment with a view to detecting acoustic waves corresponding to acoustic waves emitted or reflected (echoes) by potential targets. The buoy 1 may as an alternative be launched from a surface vessel, for example from a platform or from an underwater vehicle. In FIG. 1 *a*, the buoy 1 is in an initial stowage configuration in which its internal elements are housed inside a casing 4. When the sonobuoy 1 is launched, a parachute 5 of the buoy is automatically deployed to slow its fall, as visible in FIG. 1 *b*.

Figure 2:
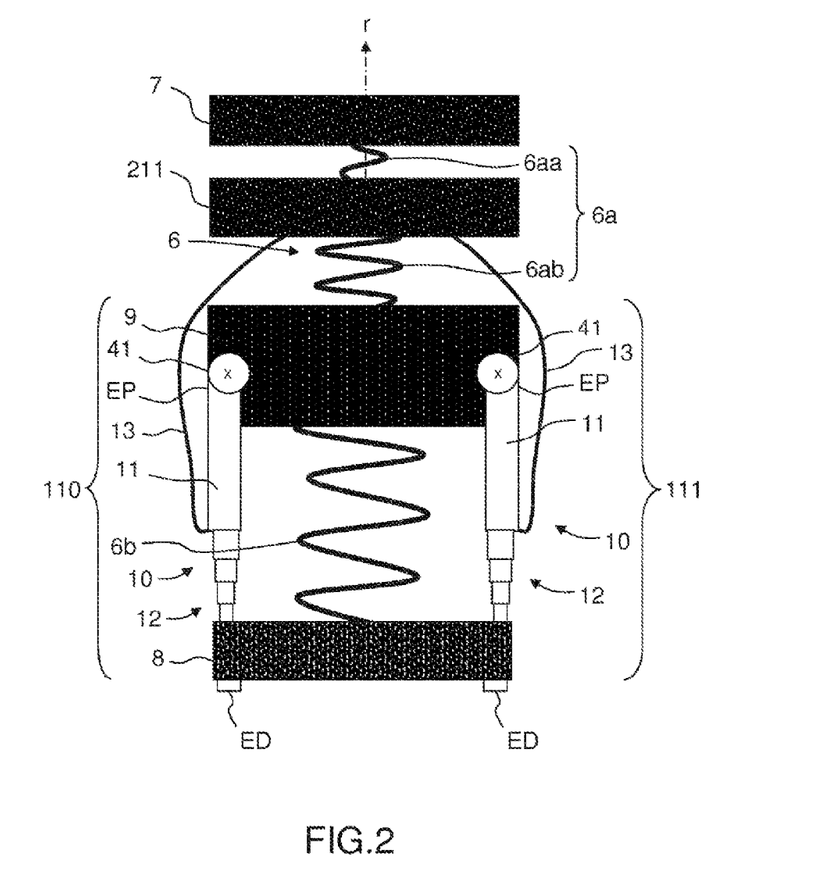

FIG. 2 schematically depicts the internal elements of the buoy as they are arranged inside the casing 4 when the buoy is in the stowage configuration.

The buoy 1 comprises a floating body 7 initially housed inside the casing 4 when the buoy is in the stowed configuration depicted in FIG. 2 without the casing. The floating body 7 is configured to float up to the surface of the water and float on the surface of the water when the buoy 1 is immersed in the water, namely when the buoy deploys to a deployed configuration depicted in FIG. 4 which will be described later.

The buoy 1 comprises a sonar 110 that has negative buoyancy. This sonar 110 is connected to the floating body 7 by a first portion 6*a* of the suspension line 6. The first portion comprises two sub-portions 6*aa*, 6*ab*. The first portion 6*a* connects the floating body 7 to the sonar 110 via an intermediate body 211. Another portion 6*b* of the suspension line connects the body 9 to the body 8.

The sonar 110 comprises a receive antenna 111 comprising the support body 9, a set of arms 10 bearing acoustic sensors which have not been depicted in FIG. 2 which schematically depicts the set of arms in the form of two diametrically opposite arms for the sake of greater clarity.

The portions 6*a* and 6*b* are initially furled.

In the example of FIG. 2, the receive antenna 111 comprises another body 8 connected to the body 9 by a second portion 6*b* of the suspension line 6, the body 8 being connected to the floating body 7 via the body 9. As an alternative, the body 8 is fixed with respect to the body 9. They may be of one piece.

The receive antenna 111 is deployable. In other words, it is able to pass from a stowed configuration of FIG. 2 into a deployed configuration of FIG. 4 such that each of the arms also passes from a stowed configuration, in which the arms are in a furled configuration, into a deployed configuration.

The arms 10 are angularly distributed about a reference axis r of the support body 9, namely about an axis r that is fixed with respect to the body 10. The arms 10 are articulated to the support body 9 in such a way as to be able to pass from the configuration of a furled configuration into the deployed configuration by the arms moving away from the axis r. More specifically, each arm 10 extends longitudinally from a proximal end EP that is articulated to the body 9 as far as a distal end ED which moves away from the axis r as the arm 10 deploys.

In the embodiment of the figures, the arms 10 pass from the furled configuration into the deployed configuration by pivoting with respect to the support body 9. The arms 10 are connected to the support body 9 by a pivot connection 41. The axis of each pivot connection 41 is tangential to the reference axis r. In other words, it is tangential to a circle centered on the reference axis r and perpendicular to the axis r. The arms extend radially in the deployed configuration.

The arms 10 are kept in the stowed configuration when the buoy 1 is in the stowed configuration depicted in FIG. 2.

In the particular embodiment of the figures, the arms 10 are telescopic. Each arm 10 comprises a first segment 11 connected to the body 9 and a set of at least one other segment 12 connected telescopically to the first segment 11 so that the arm 10 can elongate. The arms 10 are able to pass from the stowed configuration of FIG. 2, in which the arms are in the furled configuration, to the deployed configuration of FIG. 4 by the elongation of the arms 10 and the rotation of the arms 10 with respect to the body 9. The arms 10 pass via a configuration referred to as elongated, depicted in FIG. 3, in which they are longer than in FIG. 2 and in which they are still in the furled configuration.

Figure 3:
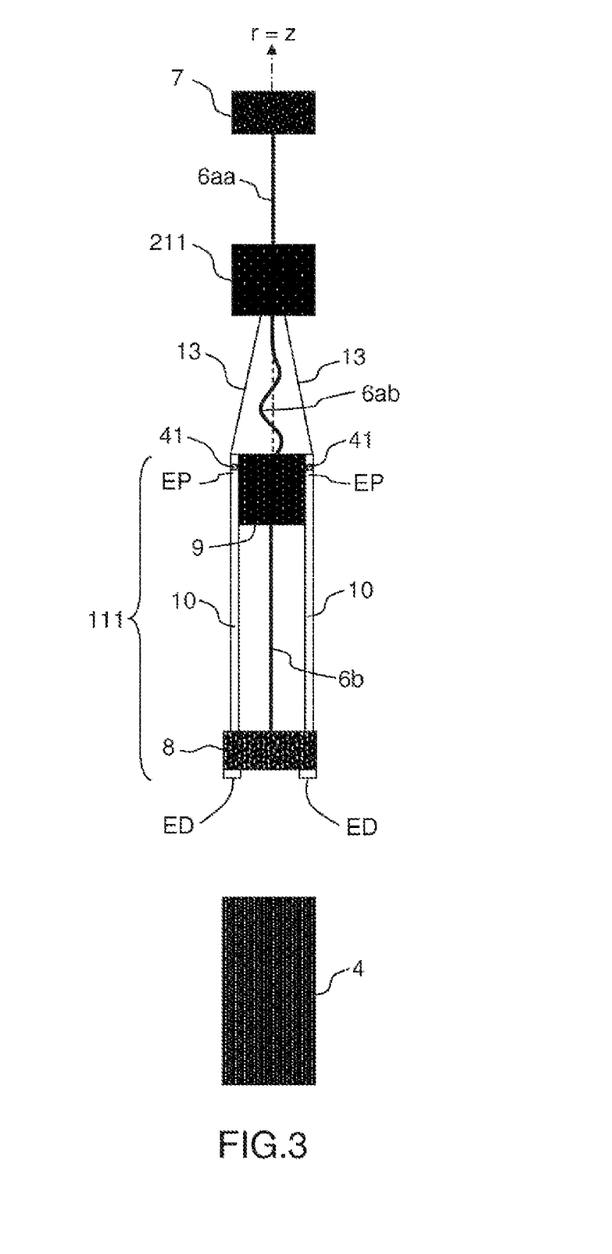
Figure 4:
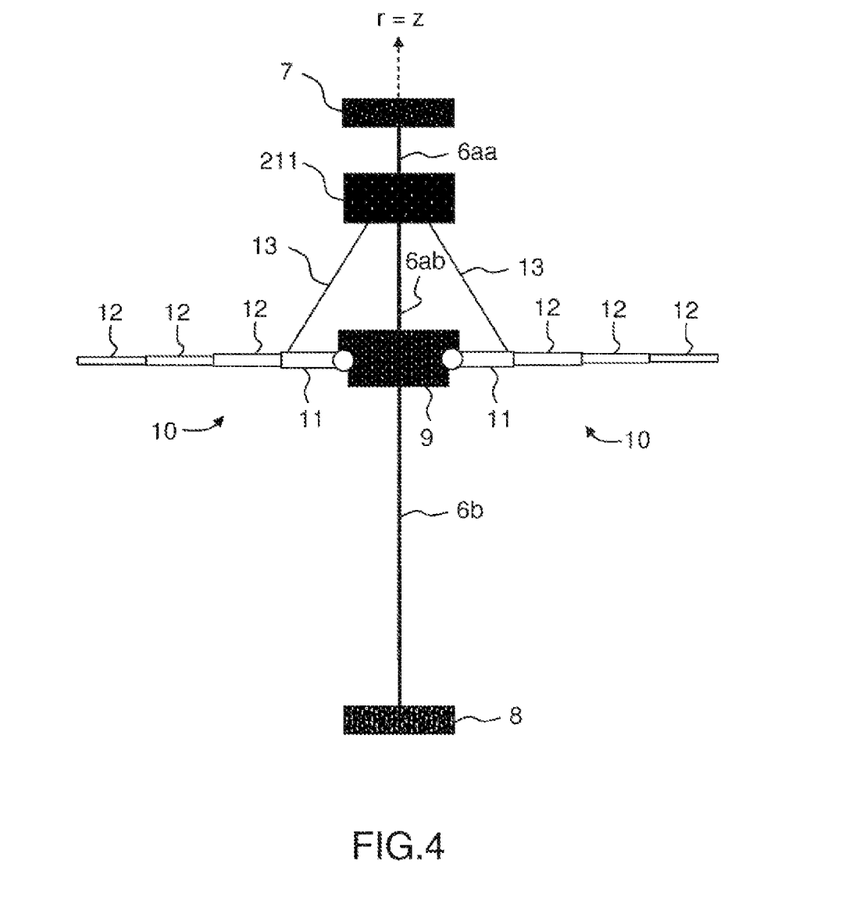

As visible in FIGS. 2 to 4, the buoy 1 comprises one guy line 13 per arm 10. Each guy line 13 is connected on the one hand to an attachment body 211 between the support body 9 and the floating body 7 and, on the other hand, to one of the arms 10, some distance from the articulation between the body 9 and the arm 10.

The guy lines 13 are configured and arranged in such a way as to allow the arms 10 to be made to pivot with respect to the body 9 toward the deployed configuration.

Figure 1C:
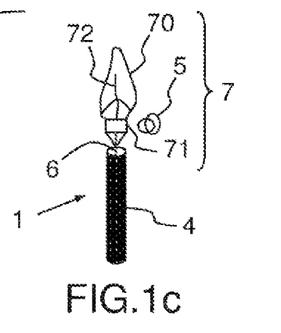

As visible in FIG. 1*c*, the floating body 7 comprises an inflatable bag 70 which emerges from the casing 4 and is inflated with a gas that is initially compressed, housed inside the buoy, when the buoy 1 plunges into the water, so that the floating body 7 exhibits positive buoyancy causing it to float up to the surface of the water 7 and remains floating on this surface S during deployment of the buoy. The floating body 7 comprises an emitter and/or receiver 72 of radioelectric waves allowing remote and wireless communication between the buoy 1 and a remote receiver and/or transmitter, as well as a housing 71 which may for example house electronic equipment.

Whereas the floating body 7 floats up toward the surface, the sonar 110 sinks, like the casing 4. The distal end ED of each arm 10 is initially mechanically coupled to the body 8 so that the arms 10 elongate as the body 9 moves away from the floating body 7 into the elongated configuration of FIG. 3.

The descent of the body 9 is halted by the portion 6*a* of the suspension line which becomes taut when the floating body 7 floats up to the surface of the water. The descent of the body 8 is halted when the arms are in their elongated configuration. The casing 4 continues to descend and therefore releases the arms 10 from their furled configuration.

The descent of the body 8 as the body 7 floats up to the surface of the water has caused an increase in the vertical distance separating the attachment body 211 from the arms 10, the guy lines 13 have become taut and therefore pull upward on the arms 10, moving the distal ends ED of the arms 10 away from the body 9 and more particularly away from the reference axis r as far as the deployed configuration of FIG. 4.

The arms 10 then extend out radially with respect to the reference axis r of the body 9 in the particular embodiment of the figures. In other words, the projections of the respective arms in a plane perpendicular to the axis r extend along respective radial axes which are defined with respect to this axis.

In the nonlimiting case of the figures, the buoy is configured in such a way that the axis r is substantially vertical (parallel to the axis z) during the passage of the arms from the furled configuration to the deployed configuration. The axis r is the longitudinal axis of the suspension line 6 which is taut along a substantially vertical axis under the effect of the differences in buoyancy between the body of the buoy.

In the embodiment of the figures, the arms 10 deploy upward. As an alternative, the arms deploy downward.

In the particular embodiment of the figures, the arms 10 extend in a plane perpendicular to the axis r of the body in the deployed configuration. As an alternative, the arms are inclined with respect to the plane perpendicular to the axis r in the deployed configuration.

Instigating the deployment of the arms by the guy lines 13 may prove difficult if not to say impossible, in particular in instances in which the arms 10 extend longitudinally substantially parallel to the axis r of the support body 9 in the furled configuration and, more generally, in instances in which the arms make, with the axis r, an angle greater than an angle made by the guy lines with the axis r when it is vertical.

The device according to the invention comprises means for instigating the deployment of the arms 10 which are configured to instigate, which means to say to commence, the deployment of the arms from their respective furled configurations. In other words, these deployment instigation means are configured to deploy the arms 10, from their furled configuration into an intermediate configuration depicted in FIG. 5 in which the arms make, with the axis r of the body 9, an intermediate angle αit which is greater than the angle αh formed between the guy lines 13 and the axis r of the body 9. This device has the effect of making the subsequent deployment of the arms 10 by the guy lines 13 from the angle αit as far as the deployed configuration more reliable and easier, or even actually possible.

Figure 6:
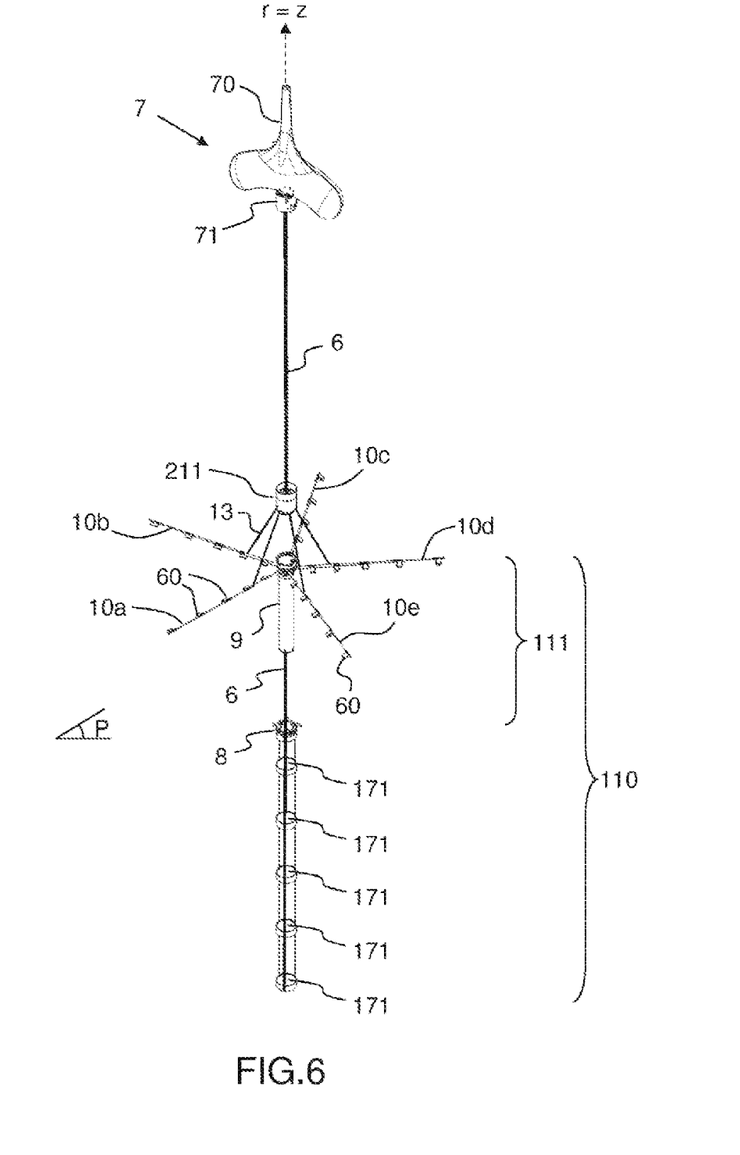

FIG. 6 depicts in perspective one particular embodiment of a buoy according to the invention comprising five arms 10a, 10b, 10c, 10d, 10e uniformly distributed about the axis z.

Figure 7:
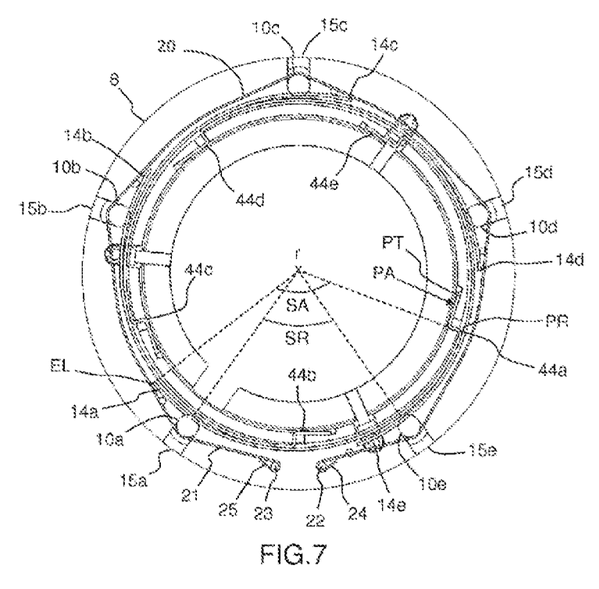

FIG. 7 schematically depicts, in section, the buoy 1 of FIG. 6, on the plane P, when the arms are being kept in the furled configuration, namely before they are deployed.

In the nonlimiting embodiment of FIG. 7, each arm 10a, 10b, 10c, 10d, 10e is initially housed, in the stowed configuration, in a housing 15a, 15b, 15c, 15d, 15e formed in the body 8. These housings 15a, 15b, 15c, 15d, 15e are open radially so as to allow the arms to deploy.

The deployment instigation means according to the invention comprise a plurality of bending springs 14a, 14b, 14c, 14d, 14e or elements that are elastic in bending.

When the arms 10a, 10b, 10c, 10d, 10e are being kept in the furled position, the bending springs 14a, 14b, 14c, 14d, 14e are stressed elastically in bending. In other words, the bending springs 14a, 14b, 14c, 14d, 14e are subjected to overall stressing in bending, which is to say stressing in bending on the overall scale. They experience an overall bending force.

The bending springs 14a, 14b, 14c, 14d, 14e are configured and arranged in such a way that when they are released, they relax, each exerting on one of the arms a thrust that is radial with respect to the reference axis, namely a thrust that has a radial component referred to as radial thrust. This radial thrust instigates the deployment of the arm concerned. When the arms 10a, 10b, 10c, 10d, 10e are released, the bending springs 14a, 14b, 14c, 14d, 14e relax to return to their rest position, namely their free position, and restitute the bending energy, instigating, which is to say commencing, the deployment of the arms from the furled configuration. The bending springs work in bending overall in order to return to their state of rest. The radial thrust exerted by the bending springs on the arms generates a turning moment on the arms at their respective axes of rotation with respect to the support body 9, causing the arms to pivot. Each bending spring is configured and arranged to instigate the deployment of a single arm, the various springs instigating the deployment of various arms.

In the nonlimiting embodiment of the figures, the bending springs 14a, 14b, 14c, 14d, 14e are initially resting against the arms 10a, 10b, 10c, 10d, 10e and exert a radial thrust on these various arms 10a, 10b, 10c, 10d, 10e.

Figure 8:
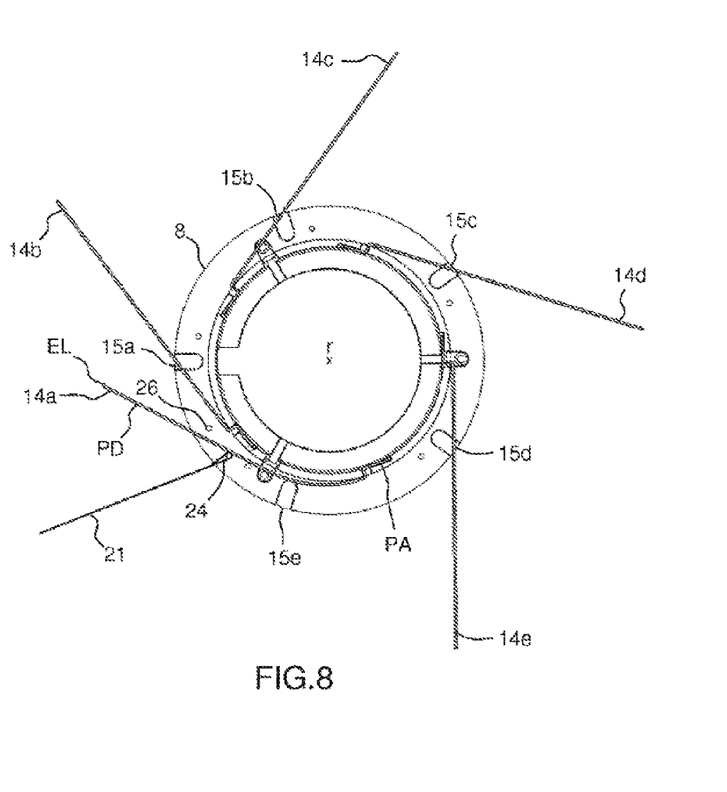
Figure 9:
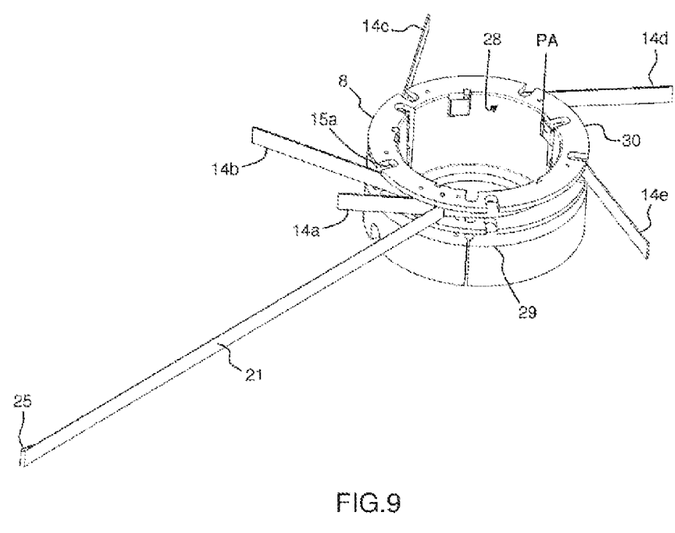

The springs 14a, 14b, 14c, 14d 14e are depicted in the relaxed configuration in FIG. 8 which schematically depicts a section through the buoy 1 of FIG. 6 on the plane P. FIG. 9 depicts a perspective view of the body 8 of FIG. 6.

Figure 5:
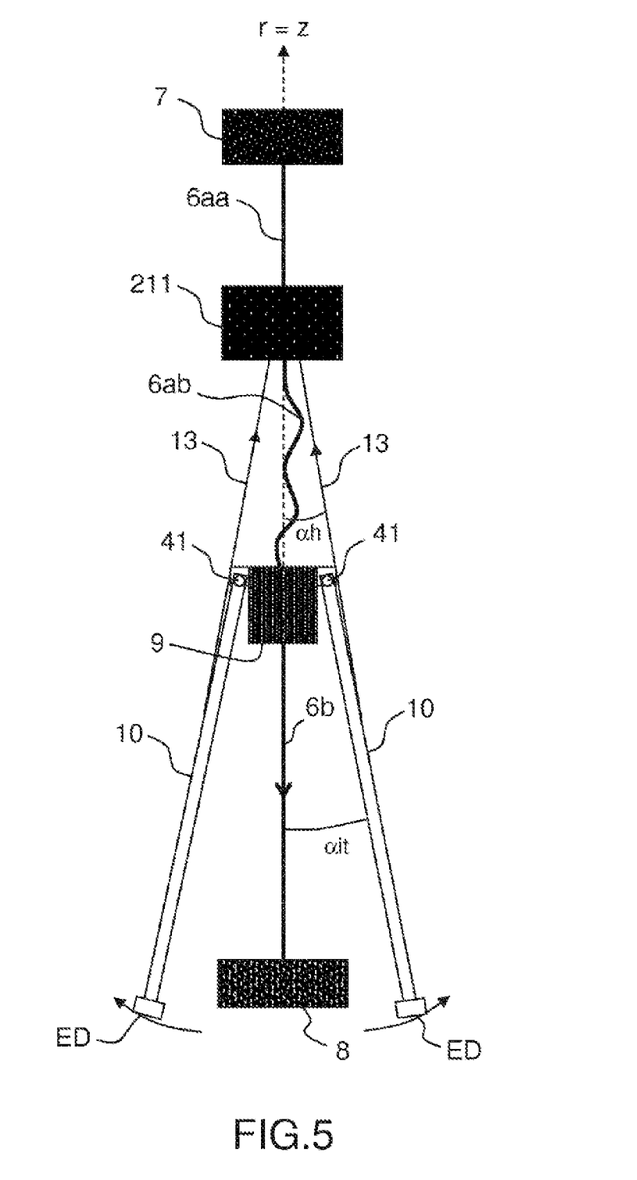

During deployment of the arms from the furled configuration into the deployed configuration, the bending spring 14a, 14b, 14c, 14d or 14e exerts a radial thrust on one arm of the 10a, 10b, 10c, 10d or 10e, respectively, allowing the arm to reach an intermediate configuration, as depicted in FIG. 5, either while remaining pressing against the arm as far as its intermediate configuration or by leaving contact with the arm before the arm reaches the intermediate configuration but by imparting to it sufficient energy that the arm can reach the intermediate configuration. When the arm 10 is in the intermediate configuration, the guy line attached to this arm is able to pull it into its deployed configuration.

The springs 14a, 14b, 14c, 14d or 14e are advantageously configured and arranged in such a way as to make the respective arms 10a, 10b, 10c, 10d and 10e leave their respective housings 15a, 15b, 15c, 15d and 15e.

The use of bending springs working in bending overall makes it possible to make the subsequent deployment of the arms by the guy lines more reliable and easier. Specifically, the energy released by the torsion springs is very high at the start but decreases very rapidly. Now, in a marine environment, the dissipation of energy is very great and this leads to very rapid slowing of the spring which could lead to arm deployment that is not enough for the guy lines to be able to take over. The release of energy by the bending springs is more constant, making it possible to impart a higher speed to the arms in the marine environment so that the arms continue to deploy even after they are no longer accompanied by the spring and even before the intervention of the guy lines.

The bending springs are also not very bulky and, in particular, are far less bulky than a torsion spring comprising a winding of turns around an axis of winding. This advantage is of key importance in the field of buoys because the internal elements of the buoy need initially to be contained within the very restricted volume delimited by the casing 4. As a reminder, the internal elements need conventionally to be stowed inside a casing of standardized length and diameter. A size A buoy needs to be housed initially inside a casing measuring 4.875 inches in diameter and 36 inches in height, one inch equaling 2.54 cm.

Furthermore, bending springs are not as expensive as torsion springs, and this is of extreme importance in the field of acoustic buoys which are single-use items. Furthermore, the use of bending springs entails the use of a restricted number of components because there is no need to provide one axis per spring or means of attaching an axis of winding to the body 8.

In the particular embodiment of the figures, the bending springs are spring leaves but they could as an alternative be produced in the form of wires, namely bending springs of circular cross section.

The bending springs are distributed about the axis r.

In the nonlimiting embodiment of the figures, the bending springs 14a, 14b, 14c, 14d, 14e are fixed to the body 8 but could as an alternative be fixed elsewhere, for example to the body 9. The bending springs each comprise an anchoring zone PA fixed to the body 8 and a deformable part PD that is fixed with respect to the body 8 when the arms are being kept in the furled configuration and that deforms elastically as the spring relaxes. The deformable part PD rests against the body 8 when the arms are in the furled configuration. These parts are referenced on only one of the springs 14a for the sake of greater clarity, the springs being identical in the nonlimiting example of the figures. The remainder of the description is given with reference to the spring 14a and to the arm 10a that it deploys. Each other spring 14b, 14c, 14d, 14e performs the same function with respect to the arm the reference of which bears the same letter as the spring (10b in the case of the spring 14b; 10c in the case of 14c, etc.) and exhibits the same features as the spring 14a. Each of the other springs 14b, 14c, 14d, 14e also exhibits the same arrangement with respect to the spring bearing the same letter as the spring (10b in the case of 14b; 10c in the case of 14c, etc.) and with respect to the arms adjacent to this arm when turning about the axis z.

Advantageously, the bending springs 14a, 14b, 14c, 14d, 14e each experience bending essentially in a plane perpendicular to the reference axis r. Each of these bending springs therefore lies substantially in the plane perpendicular to the axis r and relaxes in this plane when the bending force applied to the spring decreases. That makes it possible to ensure the compactness of the deployment device, the angular amplitude of the deployment being further reduced by making the springs work in bending in the plane perpendicular to the axis r than parallel to the axis z.

Each bending spring 14a is positioned, in the stowed configuration, between at least one of the arms 10a and the axis r.

Each spring is in bending about the axis r, which is to say wound around the axis r under the effect of the bending force, and relaxes, which is to say unwinds as it extends when the arms are released from their respective furled configurations. In other words, a radius of curvature of the deformable part PD increases as the spring extends. Thus, the bending springs are capable of accompanying the arms, namely of resting against the arms, over a radially longer travel than a torsion spring comprising a lever occupying a radial sector of the same extent as the bending spring about the axis z because the lever would not deform as the bending spring deployed.

When the arms are being kept in the furled configuration, the deformable part PD rests over its entire length against a curved surface of the body 8, curved around the axis r. The deformable part PD follows the curvature of the curved surface around the axis r.

In the nonlimiting embodiment, the curved surface 8 has a circular curvature in a plane perpendicular to the axis r. As an alternative, the curved surface 8 could have some other curvature about the reference axis r. It may in particular exhibit a curvature that varies in a plane perpendicular to the axis r.

The point of bearing of the deformable part PD of a bending spring 14a, 14b, 14c, 14d, 14e against the body 8 moves away from the end ED as the bending spring deploys.

In the nonlimiting example of FIGS. 4 and 5, the deformable part PD of each bending spring initially has a maximum radius of curvature substantially equal to the minimum radius of curvature of a circular arc connecting the two adjacent arms. At rest, each spring has, in the plane perpendicular to the axis z, a substantially straight part extending from the free end as far as a curved part connected to the anchoring part.

This feature makes it possible to prevent the spring 14a deploying one of the arms 10b from disturbing the deployment of the other arm. In other words, more generally, each spring 14a is configured in such a way as to remain distant from the arms adjacent to the arm 10b during its deployment.

Advantageously, the deformable part PD of each spring, for example the spring 14a, is interposed between the axis r and at least between two adjacent arms 10a, 10e in the case of the spring 14a, namely a first arm 10a the deployment of which it instigates and a second arm, in this instance the arm 10e, which is one of the two arms 10b, 10e adjacent to the first arm 10a. In other words, the deformable part PD of the bending spring 14a extends around the axis r when the arms 10 are being kept in the furled configuration, over an angular sector SA comprising at least two arms 10a, 10e. In other words, the bending spring 14a occupies, about the axis r, an angular sector SA that has an angle greater than or equal to the angular sector SR delimited by the arm 10a the deployment of which is instigated by the spring 14a and a second arm 10e adjacent to the first arm 10a. In this way, the bending spring 14a is able to accompany the first arm 10a over a significant radial travel and/or to impart a high speed to it. This configuration is made possible by the use of a bending spring which occupies a small amount of space because it entails the superposition of the adjacent springs between the arms and the axis r in the event that the springs occupy the one same plane perpendicular to the axis r. The winding of turns of a torsion spring would make it difficult to superpose two springs. The thickness e of the ring, of which the axis is the reference axis r, that can be occupied by the springs is highly limited in the case of buoys in which the elements of the buoy need to occupy a casing of standardized volume.

In the particular embodiment of the figures, the deformable part PD of each bending spring 14a has a length greater than an arc of a circle centered on the axis z and connecting the two arms 10a and 10e between which the spring 14a extends.

Advantageously, the deformable part PD of the bending spring 14a extends beyond the sector SR on the side of the second arm 10e. In other words, the deformable part PD extends beyond the sector SR beyond the second arm 10e. That allows a higher speed to be imparted to the arm 10a. Specifically, the further the anchoring point PA of the bending spring 14a is away from the arm 10a, the higher the speed at which the arm 10a is ejected. Thus, when the arms 10a are furled, the deformable parts PD of the bending springs 14 that deploy the adjacent arms are superposed in instances in which the springs extend in the one same plane perpendicular to the axis r. In other words, several springs 14a, 14e are interposed between the arm 10e and the axis r.

Advantageously, the bending spring 14a is configured and arranged in such a way as to lie, when at rest, beyond the radial axis R on which the arm 10a lies with respect to its anchoring part PA. That makes it possible to ensure that the spring exerts a significant radial thrust on the arm so long as it lies on the radial axis (deployment not being halted while its free end EL lies on the radial axis). Furthermore, the deployment of the bending spring is of use throughout the duration of the deployment because it does not leave the radial axis before reaching its position of rest.

Advantageously, when the arms 10a are being kept in the furled configuration, the free end EL of the deformable part PD of the spring 14a lies beyond the sector SR on the side of the first arm 10a. In other words, the free end EL extends beyond the sector SR on the side of the first arm 10a. This configuration is rendered possible by the use of a bending spring that has a limited volume because it involves, when the arms are furled, superposition of the spring 14a and of the spring 14b which deploys a third arm 14b adjacent to the first arm 14c on the other side of the second arm 14e.

In the advantageous embodiment of the figures, the deformable part PD comprises two parts, each of which is superposed with the mobile parts of two adjacent springs in when the arms are in their respective furled configurations.

In the nonlimiting example of the figures, the bending springs 14a, 14b, 14c, 14d, 14e are positioned near the distal end ED of the arms 10. That makes it possible to limit the risks of the arms becoming deformed with respect to a configuration, like the one disclosed in patent application WO 2010025494, in which torsion springs of which the turns are wound around the axis of the pivot connection of each arm, are provided for initiating the deployment of the arms. Specifically, the springs positioned at the articulation of the arms generate, on the arms, radial forces that oppose those that are exerted by the casing 4 in the vicinity of these articulations as the casing sinks. Arranging the springs near the distal ends of the arms makes it possible to limit the risks of deformation of the arms and therefore the risks of the arms becoming trapped in the casing making the buoy inoperative as well as reducing the risks of a reduction in buoy performance as a result of the loss of certain sensors as they are extracted from the casing or due to incorrect positioning of the sensors. Furthermore, this solution close to the distal ends of the arms, requires a lower bending force in order to ensure the deployment of the arms and makes it possible to make it easier to eject the arms from their housings.

As an alternative, the bending springs 14a, 14b, 14c, 14d, 14e are positioned near the proximal end EP, namely near the articulations of the arms to the support body 9. This solution allows a high speed to be imparted to the arms and allows the arms to be accompanied as far as an angle of deployment that is large but requires a high bending force which is unfavorable to the compactness of the device.

As an alternative, one part of the springs is positioned near the distal end and another part of the springs near the proximal end. In general, the bending springs can be positioned anywhere on the arms between the articulation and the distal end of the arms.

As visible in FIG. 7, the buoy 1 comprises retaining means 20 configured to keep the arms 10a, 10b, 10c, 10d, 10e furled when the casing 4 is covering the arms 10a, 10b, 10c, 10d, 10e and to release the arms 10a, 10b, 10c, 10d, 10e when the casing 4 is no longer covering the arms 10a, 10b, 10c, 10d, 10e. These means comprise a flexible clamping band 21 which is placed under elastic bending to surround the arms 4 so as to keep them furled, which also ensures that the bending springs 14a, 14b, 14c, 14d, 14e are kept in bending. As the clamping band 21 surrounds the arms 10a, 10b, 10c, 10d, 10e, the bending springs 14a, 14b, 14c, 14d, 14e bear against the respective arms and apply a radial thrust to these respective arms, but the clamping band prevents the arms from moving.

The clamping band 21 also advantageously surrounds the bending springs 14 a, 14 b, 14 c, 14 d, 14 e, thereby making it possible to limit the problems of arm deformation. As an alternative, the clamping band is offset with respect to the bending springs along the axis r.

The flexible band 21 is kept in bending by two pins 22, 23. The pins 22, 23 are initially inserted in openings 24, 25 formed at the two longitudinal ends of the clamping band.

The pin 22 is fixed with respect to the body 8 and the pin 23, pushed into a passage 26 formed in the body 8, is initially held in place in this passage 26 by friction. The passage 26 is visible in FIG. 8. The pin 23 leaves the opening 25 when the buoy becomes immersed, when the casing 4 no longer covers the arms, so as to release the clamping band 21 thus releasing the arms 10 from their furled configuration and the bending springs 14. For example, the pin 23 is coupled to the casing 4 by a filament which unfurls as the casing 4 sinks away from the body 8. In this way, as the casing 4 sinks while the body 8 is held by the floating body 7, the filament connecting the pin 23 to the casing 4 unfurls and the casing 4 exerts enough of a traction force to eject the pin 23 from the passage 26 and therefore from the opening 25, thus releasing the clamping band 21.

The use of two pins 22, 23 of which just one, the pin 23, is able to move, makes it possible to limit the force needed to release the clamping band 21 and thus limit the risks of the pin 23 becoming jammed through a shearing and hammering effect. This solution also makes it possible to provide a casing 4 which is lightweight, for example made of aluminum, which is inexpensive and requires no surface treatment for being introduced into a marine environment. The fixed pin 22 makes it possible to maintain a connection between the body 8 and the clamping band 21 and thus limit the risk of the clamping band 21 being hurled, during its deployment, onto one of the arms, as this could impede the deployment of the arms or cause material damage.

In a less advantageous alternative form, the two ends of the clamping band 21 are connected to the one same pin which is automatically withdrawn as the buoy is immersed in order to release the clamping band, the arms and the spring leaves.

As an alternative, the casing 4 is made of steel, making it easier to release the clamping band, particularly in the case of one single pin.

In an less advantageous alternative form, the casing 4 constitutes the means for keeping the arms in the furled configuration and the bending springs in bending.

In another alternative form, distinct retention means are provided to keep the arms in the furled configuration and to keep the arms in the open configuration. The clamping band for example surrounds only the springs and the arms are kept in the furled configuration only by the casing.

As visible in FIG. 9, the body 8 is substantially in the shape of a cable drum of axis z comprising a tube 28 of axis r positioned between two flanges 29, 30 of washer shape in cross section centered on the axis r and extending perpendicular to the axis r. The housings 15a, 15b, 15c, 15d, 15e are created in the body 8. Each housing comprises a radial slot created in each flange. The two slots are created facing one another. The distal ends ED of the arms each comprise a first part housed in the housings. This first part is extended by a part of larger diameter than the housing perpendicular to the axis r so that the arms can elongate, holding the body 8.

The bending springs 14a, 14b, 14c, 14d, 14e and the bending band 21 are housed between the two flanges and this allows them to be held in a position that is substantially fixed with respect to the body 8 along the axis r and to be driven by this body 8 as it moves along the axis r.

As visible in FIGS. 7 to 9, the anchoring parts PA of the bending springs are fixed to the body 8 only by the collaboration of shape between the body 8 and the respective bending springs. That makes it possible to limit the number of components and therefore the complexity of assembly, the volume occupied by the deployment instigation device and the reliability thereof.

In the embodiment of the figures, the body 8 comprises slots 44a, 44b, 44c, 44d, 44e uniformly spaced about the axis r and passing through the tube 28. The anchoring part PA of each spring is bent over and comprises two parts that are inclined with respect to one another in the plane perpendicular to the axis z, these being a radial part PR and a tangential part PT connected to the deformable part PD by the radial part PR. The radial part PR enters a radial part of the radial slot 44a, 44b, 44c, 44d, 44e made in the tube and the anchoring part PA is extended by the tangential part PT and is inserted in a tangential part of the radial slot that comes to bear against a tangential internal wall of the slot.

As an alternative, the anchoring part PA comprises only a part pushed into a radial opening created in the cable drum.

As an alternative, the means for instigating the movement of the arms further comprise means for fixing the anchoring parts PA of the bending springs to the body 8.

As visible in FIG. 6, the buoy comprises hydrophones 60 mounted on the arms.

The suspension line 6 may be configured to allow a transfer of data between the floating body 70 and the body 9 itself electrically connected to the hydrophones 60.

The suspension line 6 may comprise at least one cable and possibly an elastic damper interposed between the cable and the floating body 70.

The sonar may also comprise other elements, such as acoustic emitters 171 for example, which are attached to the suspension line 6 as visible in FIG. 6 initially housed in the casing 4. The receive antenna 111 is interposed between the emitters 171 and the floating body 7 on the line 6.

As an alternative, the deployment instigation means comprise a single bending spring configured and arranged to instigate the deployment of all the arms. The arms then deploy consecutively. The deformable part PD of the bending spring is then advantageously wound around the axis r over more than one turn. As an alternative, the deformable part PD is wound over less than one turn or over one turn. The amplitude of deployment is less but the deployment of certain arms creates a destabilization of the buoy which allows the guy lines to deploy all the arms. As an alternative, a number of bending springs are provided. Each spring is configured and arranged to instigate the deployment of a set of at least one arm or of several arms. The arms of the various sets of arms are distinct. In other words, the deployment of each arm is instigated by a single bending spring and each bending spring instigates the deployment of one or several arms. As an alternative, just part of the arms is associated with a bending spring which will instigate its deployment, for example a single arm.

The invention claimed is:

1. An underwater device intended to be deployed in the water, the device comprising:
    a set of arms articulated to a support body having a reference axis r, the arms being able to be kept in a furled configuration and able to deploy into a deployed configuration wherein the arms extend about the reference axis r, the arms deploying by distal ends (ED) of the arms moving away from the axis r,
    a set of at least one bending spring stressed elastically in bending when the arms are kept in a furled configuration and able to relax when the arms are released from the furled configuration, the set of at least one bending spring being configured and arranged in such a way as to exert, on at least one of the arms, when the arms are released from the furled configuration, a thrust that instigates the deploying of the arms,
    wherein at least one bending spring comprises an anchoring part (PA) that is fixed with respect to the reference axis r and a deformable part (PD) that deforms when said bending spring relaxes, the deformable part (PD) being wound around the reference axis when the arms are being kept in the furled configuration, and unwinding as said bending spring relaxes.

2. The underwater device as claimed in claim 1, wherein the bending spring is arranged in such a way as to deform essentially in a plane perpendicular to the reference axis as it relaxes.

3. The underwater device as claimed in claim 1, wherein the arms are angularly distributed about the reference axis r of the support body.

4. The underwater device as claimed in claim 3, wherein the bending spring comprises the anchoring part (PA) that is fixed with respect to the axis r and the deformable part (PD) that deforms as the bending spring relaxes, the deformable part (PD) extending about the axis r, when the arms are being kept in the furled configuration, over an angular sector (SA) comprising a reference angular sector (SR) delimited by a first arm of the set of arms on which the bending spring exerts a thrust so as to instigate its deployment as it relaxes and by a second arm of the set of arms, which arm is adjacent to the first arm.

5. The underwater device as claimed in claim 4, wherein the deformable part (PD) extends beyond the reference angular sector (SR), on the side of the second arm.

6. The underwater device as claimed in claim 4, wherein the deformable part (PD) extends beyond the reference angular sector (SR), on the side of the first arm.

7. The underwater device as claimed in claim 4, wherein the deformable part (PD) comprises a free end (EL) lying beyond the reference sector (SR) in the opposite direction to the second arm when starting from the first arm.

8. The underwater device as claimed in claim 1, wherein the set of at least one bending spring comprises several bending springs, each bending spring being configured and arranged in such a way as to instigate the deployment of a single arm.

9. The underwater device as claimed in claim 8, wherein the bending springs are superposed when the arms are being kept in the furled configuration.

10. The underwater device as claimed in claim 1, wherein the set of at least one bending spring is positioned close to the distal end of the arm.

11. The underwater device as claimed in claim 1, comprising retaining means able to keep the arms in the furled configuration and to release them, said retaining means comprise a flexible clamping band placed under elastic bending in order to surround the arms so as to keep them in the furled configuration, the flexible band being kept under bending by two pins, the flexible band being released by driving just one of the two pins in a translational movement with respect to the flexible band along the reference axis.

12. The underwater device as claimed in claim 1, being an air-launchable sonobuoy.

13. The underwater device as claimed in claim 1, wherein the bending spring is stressed in bending overall, when the arms are being kept in the furled configuration, and works in bending overall when the arms are released.

14. The underwater device as claimed in claim 1, wherein the thrust that instigates the deployment of the arm has a component that is radial with respect to the reference axis.

* * * * *